United States Patent
Hukkeri et al.

(10) Patent No.: US 11,897,461 B2
(45) Date of Patent: Feb. 13, 2024

(54) METHODS AND SYSTEMS FOR AUTONOMOUS VEHICLE COLLISION AVOIDANCE

(71) Applicant: FORD GLOBAL TECHNOLOGIES, LLC, Dearborn, MI (US)

(72) Inventors: Ramadev Burigsay Hukkeri, Pittsburgh, PA (US); Zhongkui Wang, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 17/472,180

(22) Filed: Sep. 10, 2021

(65) Prior Publication Data
US 2023/0084313 A1 Mar. 16, 2023

(51) Int. Cl.
*B60W 30/09* (2012.01)
*B60W 60/00* (2020.01)
*B60W 30/095* (2012.01)
*B60W 40/04* (2006.01)
*B60W 40/105* (2012.01)

(52) U.S. Cl.
CPC ........ *B60W 30/09* (2013.01); *B60W 30/0956* (2013.01); *B60W 40/04* (2013.01); *B60W 40/105* (2013.01); *B60W 60/0015* (2020.02); *B60W 60/00274* (2020.02); *B60W 2554/4044* (2020.02); *B60W 2554/80* (2020.02)

(58) Field of Classification Search
CPC .. B60W 30/09; B60W 30/0956; B60W 40/04; B60W 40/105; B60W 60/0015; B60W 60/00274; B60W 2554/4044; B60W 2554/80; B60W 2554/801; B60W 2554/802; B60W 60/0027
See application file for complete search history.

(56) References Cited

U.S. PATENT DOCUMENTS

| | | | |
|---|---|---|---|
| 10,725,470 | B2 | 7/2020 | Mahabadi et al. |
| 2019/0369616 | A1* | 12/2019 | Ostafew .......... B60W 60/00274 |
| 2019/0377354 | A1* | 12/2019 | Shalev-Shwartz ... G05D 1/0231 |
| 2020/0122721 | A1 | 4/2020 | Zhang et al. |
| 2020/0319646 | A1 | 10/2020 | O'Donnell |
| 2021/0108936 | A1 | 4/2021 | Seegmiller et al. |
| 2022/0073063 | A1* | 3/2022 | Jankovic .......... B60W 30/0953 |
| 2023/0054263 | A1* | 2/2023 | Lin .................. B60W 30/0956 |

FOREIGN PATENT DOCUMENTS

EP 3725630 A1 10/2020

\* cited by examiner

*Primary Examiner* — Peter D Nolan
*Assistant Examiner* — Anwar Mohamed
(74) *Attorney, Agent, or Firm* — Frank MacKenzie; Brooks Kushman P.C.

(57) ABSTRACT

A method includes identifying an object that is invading a lane that an autonomous vehicle is occupying, and generating a constraint about a point of crossing, where the constraint has a direction and a length, and the point of crossing represents a location of where the object and the autonomous vehicle will collide if the object maintains its current trajectory and the autonomous vehicle maintains its current trajectory. The method includes applying the constraint to a motion plan associated with the autonomous vehicle, and issuing one or more commands to adjust movement of the autonomous vehicle in response to encountering the constraint.

19 Claims, 14 Drawing Sheets

METHODS AND SYSTEMS FOR AUTONOMOUS VEHICLE COLLISION AVOIDANCE

BACKGROUND

Current collision avoidance systems for autonomous vehicles tend to shift the position of an autonomous vehicle laterally to provide a sufficient margin between an object and the autonomous vehicle. These avoidance systems often consider many different paths that are either systematically or randomly generated, such as curves or different lateral offsets, and selects the one that has a sufficient margin between the object and the autonomous vehicle.

However, this approach often leads to a feeling of a narrow miss for passengers of the autonomous vehicle. In addition, current approaches to collision avoidance do not consider that humans often use lane marks as a guideline for when and how much action should be taken to avoid other objects.

This document describes methods and systems that are directed to addressing the problems described above, and/or other issues.

SUMMARY

The present document relates to systems and methods for navigating an electronic device. The method includes identifying an object that is invading a lane that an autonomous vehicle is occupying, and generating a constraint about a point of crossing, where the constraint has a direction and a length, and the point of crossing represents a location of where the object and the autonomous vehicle will collide if the object maintains its current trajectory and the autonomous vehicle maintains its current trajectory. The method includes applying the constraint to a motion plan associated with the autonomous vehicle, and issuing one or more commands to adjust movement of the autonomous vehicle in response to encountering the constraint.

The object that is invading a lane that the autonomous vehicle is occupying may be an oncoming object that is crossing a centerline of a road.

The constraint may have a direction that is parallel to a lane boundary that is located between the autonomous vehicle and the object.

The method may generate the constraint about the point of crossing by selecting a higher of a minimum distance or a product value as a constraint length, where the minimum distance represents a distance before the point of crossing, and where the product value represents a product of a minimum amount of time before the point of crossing and a current speed of the autonomous vehicle. The starting point for the constraint may be based on a distance value between the autonomous vehicle and the point of crossing, and a difference between the distance value and the constraint length.

The method may include generating the constraint with a lateral position relative to a lane boundary that is a function of an amount of invasion of the object into the lane.

Issuing the command to adjust the movement of the autonomous vehicle in response to encountering the constraint may include issuing the command to adjust lateral motion of the autonomous vehicle.

Issuing the one or more commands to adjust the movement of the autonomous vehicle in response to encountering the constraint may include issuing the one or more commands to adjust the longitudinal motion of the autonomous vehicle.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

This document describes methods and systems for causing autonomous vehicles to implement collision avoidance techniques in a naturalistic manner. Human drivers typically use landmarks as guides to determine how non-compliant an object is. For example, a human driver assesses how non-compliant an on-coming vehicle is by how far over the centerline of a roadway the object is. If an object is slightly over the centerline, a human driver may make a minimal adjustment to avoid the object. However, if the object is significantly over the centerline, a human driver may take more extreme action.

As described in more detail below, in order to veer naturalistically to avoid objects in the lane of an autonomous vehicle, the autonomous vehicle may consider to what extent the object is invading the lane and preemptively veer over to avoid the object. The degree to which the autonomous vehicle veers (and how soon the autonomous vehicle elects to veer) may be based, at least in part, on the extent of the invasion of an object into the autonomous vehicle's lane. In various embodiments, lane markers may be used to not only determine the amount of invasion of an object, but also as a guide of spatially how to veer to avoid the object.

An autonomous vehicle may share the road with one or more objects. Examples of objects may include, without limitation, vehicles (e.g., cars, trucks, bicycles, motorcycles, etc.), pedestrians, autonomous vehicles, and/or the like. An object may be moving in the same direction as an autonomous vehicle (e.g., in a lane adjacent to the autonomous vehicle or in front of or behind the autonomous vehicle in the same lane). An object may be moving in a direction that is not the same as that of the autonomous vehicle. For example, an object may be moving in an opposite direction to that of the autonomous vehicle (e.g., in a lane of oncoming traffic).

Figure 1:
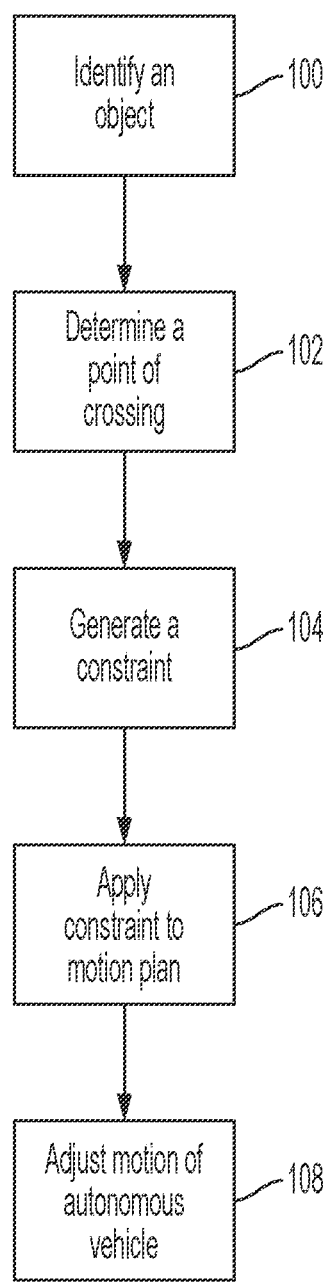
FIG. 1 illustrates a method of performing collision avoidance by a system.

FIG. 1 illustrates a method of performing collision avoidance by a system according to an embodiment. As illustrated by FIG. 1, a system may identify 100 an object that is invading the lane that the autonomous vehicle is occupying (referred to throughout this disclosure as an autonomous vehicle's lane). A system may identify 100 an object if that object is occupying at least a portion of the autonomous vehicle's lane. For instance, an object that crosses a centerline of a roadway and that occupies a portion of an autonomous vehicle's lane may be identified 100. As another example, an object that crosses a lane boundary and occupies a portion of the autonomous vehicle's lane may be identified 100.

In various embodiments, a location or position of one or more lane markers or boundaries may be included in map data that is accessible to the autonomous vehicle. The system may detect an object using, for example, its LiDAR system. The system may compare a position of an object to that of one or more lane boundaries associated with the lane that the autonomous vehicle is occupying to determine whether the object is invading its lane.

Figure 2:
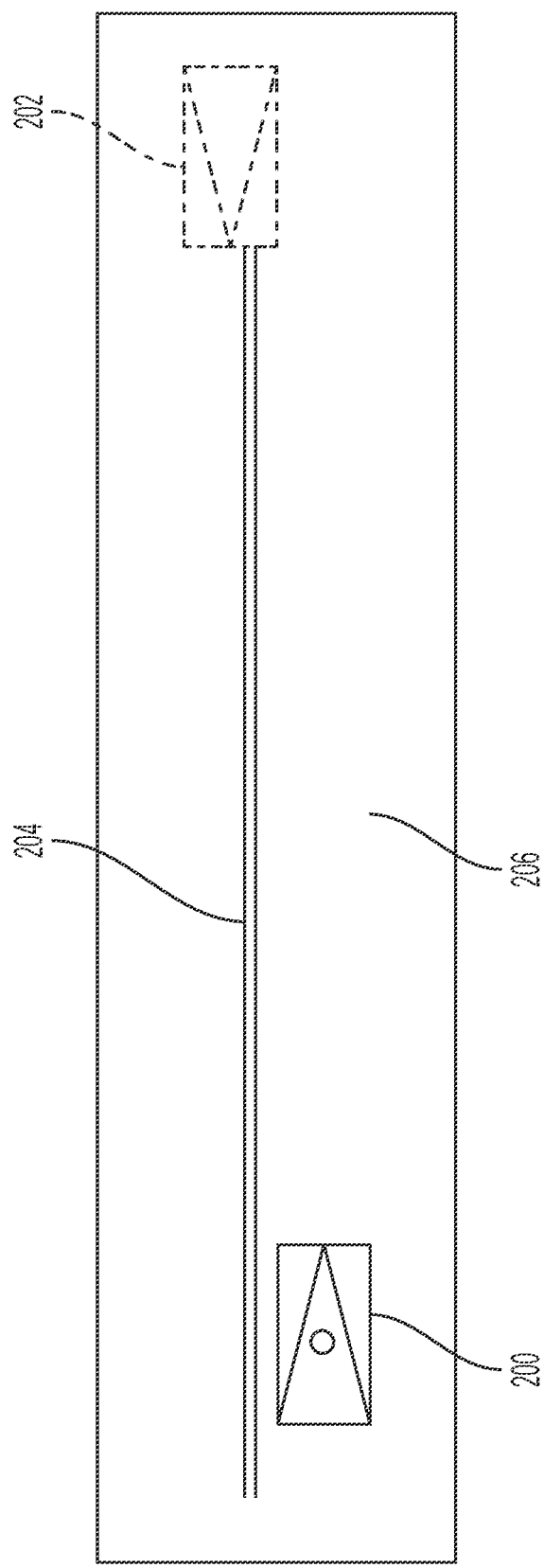
FIG. 2 illustrates an example where an oncoming object is invading the lane of an autonomous vehicle.

FIG. 2 illustrates an example where an oncoming object 204 is invading the lane 206 of an autonomous vehicle 200. As illustrated by FIG. 2, the object has crossed over the centerline 204. If both the autonomous vehicle 200 and the object 204 continue on their current paths, they will collide with one another.

Figure 3:
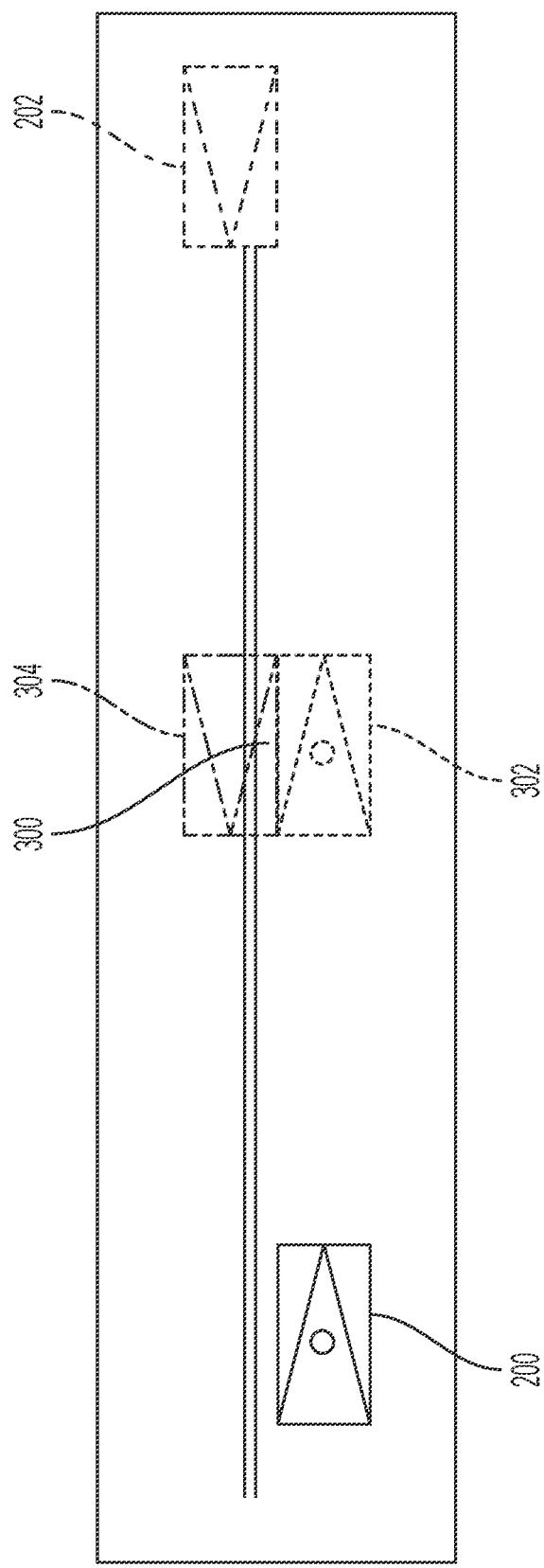
FIG. 3 illustrates an example point of crossing.

In various embodiments, the system may determine 102 a point of crossing. A point of crossing refers to a spatiotemporal location or a range of spatiotemporal locations where an autonomous vehicle and an object will collide if they both maintain their current paths. FIG. 3 illustrates a point of crossing 300 where the autonomous vehicle 200 and object 202 of FIG. 2 will collide if they both maintain their paths and current speed. For example, the system may predict one or more locations of the object along its current trajectory assuming it maintains its current speed. The system may predict one or more locations of the autonomous vehicle along its current trajectory assuming it maintains its current speed. The system may identify the location where the autonomous vehicle's location and the object's location overlap or intersect, and identify this as the point of crossing.

Figure 4:
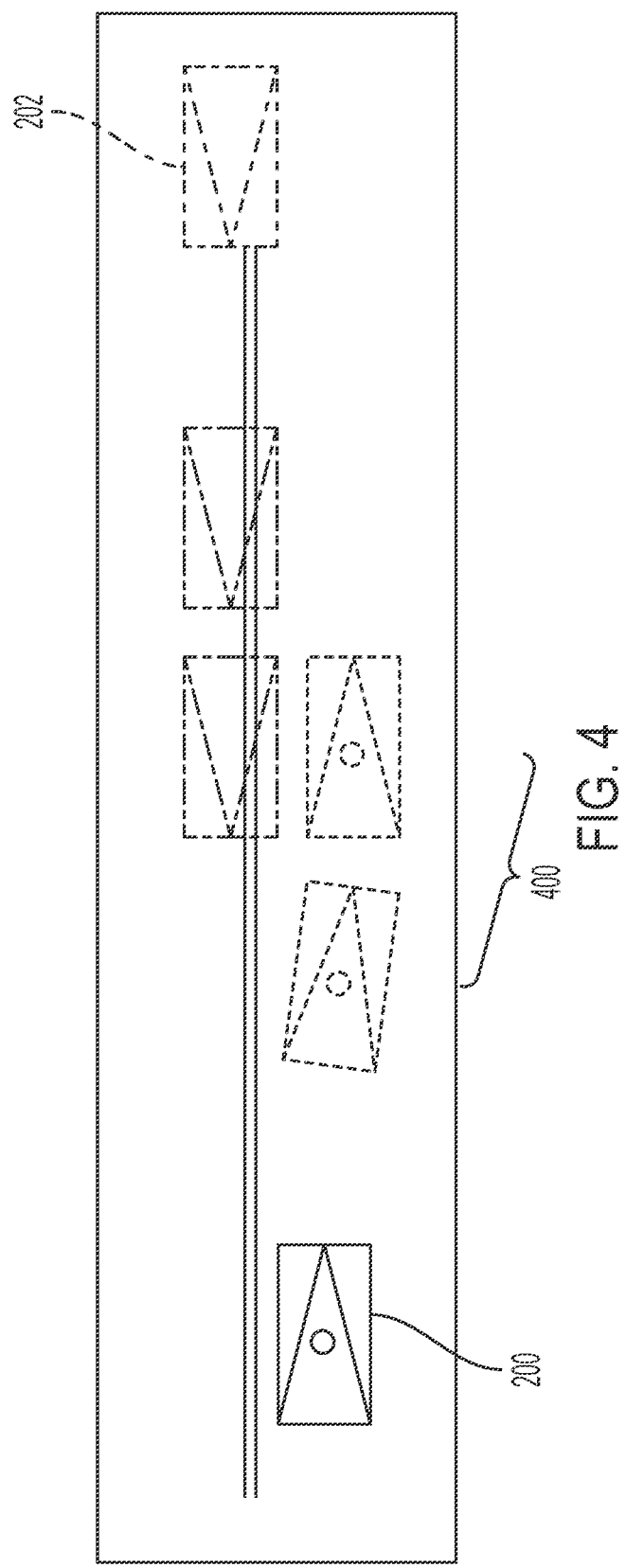
FIG. 4 illustrates an example trajectory of an autonomous vehicle.

Making navigation decisions based on this point of crossing may result in the autonomous vehicle veering just in time to avoid the object. This approach can feel unsafe to passengers of the autonomous vehicle, even if a collision is avoided. FIG. 4 illustrates an example trajectory 400 of the autonomous vehicle 200 of FIG. 2 that veers to avoid a collision with the object 202.

Referring back to FIG. 1, the system may generate 104 a constraint about the point of crossing. A constraint refers to a restriction of motion of an autonomous vehicle. A constraint may have a direction and a length, which may provide instructions to an autonomous vehicle as to when to begin changing direction and how much of an adjustment to its movement is needed to avoid a collision with an object. A constraint may be used to penalize undesired behavior and incentivize desired behavior.

In various embodiments, the system may generate 104 a constraint having a direction that is parallel to one or more road or lane boundaries. For example, a constraint may extend parallel to a centerline of a road. This will cause the autonomous vehicle that encounters the constraint to follow the shape of the road, which is typically how human drivers maneuver.

Figure 5:
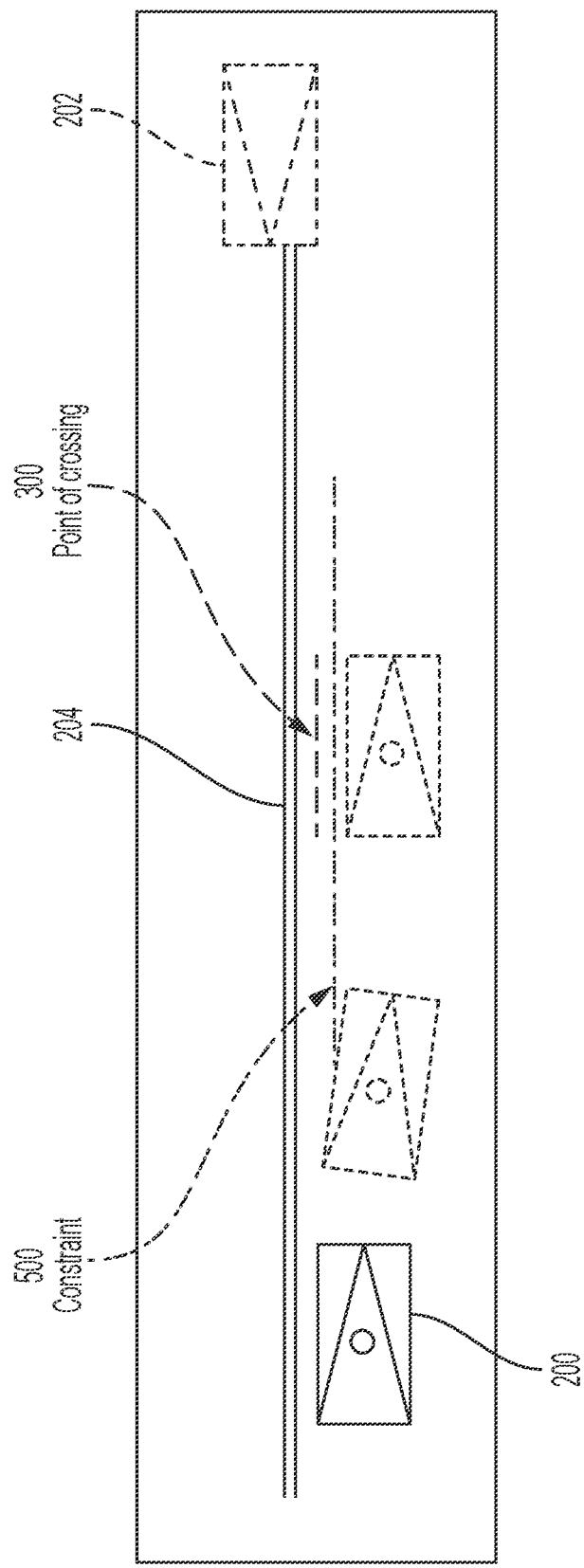
FIG. 5 illustrates an example constraint.

FIG. 5 illustrates an example constraint 500 according to an embodiment. As shown in FIG. 5, the constraint 500 extends parallel to the centerline 204.

Figure 6:
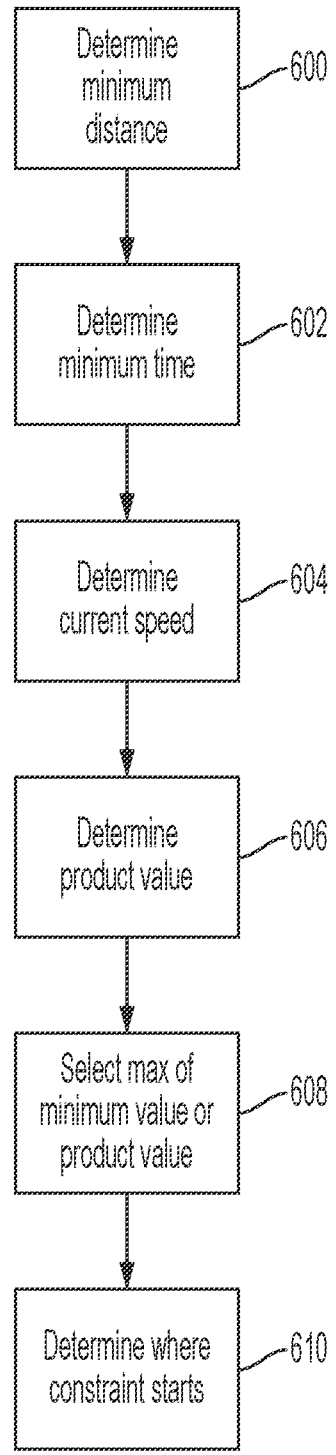
FIG. 6 illustrates an example method of determining a length of a constraint.

The system may generate 104 a constraint having a length with a starting point before the point of crossing. FIG. 6 illustrates an example method of determining a length of a constraint according to an embodiment. As illustrated by FIG. 6, the system may determine 600 a minimum distance. A minimum distance refers to a distance before a point of crossing. The system may determine 602 a minimum time. A minimum time refers to a minimum amount of time before a point of crossing that an autonomous must veer in order to avoid an object. The system may determine 604 a current speed of the autonomous vehicle.

The system may determine 606 a product value equal to the product of the minimum time and the current speed of the autonomous vehicle. This product value may be distance according to various embodiments. The system may determine a length of a constraint by selecting 608 the higher of the minimum distance or the product value. As such, the length of a constraint may be represented by the following:

$$\text{Constraint length} = \max(\text{minimum distance}, \text{minimum time} * \text{current speed})$$

In various embodiments, the above representation may be used when the autonomous vehicle is operating at a constant velocity. If the autonomous vehicle is not operating at a constant velocity, the constraint length may be determined by integrating over a minimum time along a predicted velocity for the autonomous vehicle.

In various embodiments, the system may determine 610 where a constraint starts by determining the difference between the distance between the autonomous vehicle and the point of crossing and the constraint length.

As an example, an autonomous vehicle may be traveling at 11 m/s and the point of crossing with an object may be 45 m ahead of the autonomous vehicle's current position. The minimum time may be 2 seconds and the minimum distance may be 10 m. The constraint length may be determined as:

$$\text{Constraint length} = \max(\text{minimum distance}, \text{minimum time} * \text{current speed}) = \max(10, 2*11) = 22 \text{ m}$$

Given the point of crossing is at 45 m, to determine where the constraint starts, the system may subtract 22 m from 45 m to determine that the constraint starts 23 m ahead of the autonomous vehicle.

As another example, an autonomous vehicle may be traveling at 3 m/s and the point of crossing with an object may be 45 m ahead of the autonomous vehicle's current position. The minimum time may be 2 seconds and the minimum distance may be 10 m. The constraint length may be determined as:

$$\text{Constraint length} = \max(\text{minimum distance}, \text{minimum time} * \text{current speed}) = \max(10, 2*3) = 10 \text{ m}$$

Given the point of crossing is at 45 m, to determine where the constraint starts, the system may subtract 10 m from 45 m to determine that the constraint starts 35 m ahead of the autonomous vehicle.

In various embodiments, the system may generate 104 a constraint having a lateral position that is a function of the amount of invasion by an object into the autonomous vehicle's lane. The further an object is invading the autonomous vehicle's lane, the more laterally shifted the constraint may be. This can be applied to roads that are curved or situations where the autonomous vehicle is turning because the lane mark information may still be present.

Figure 7:
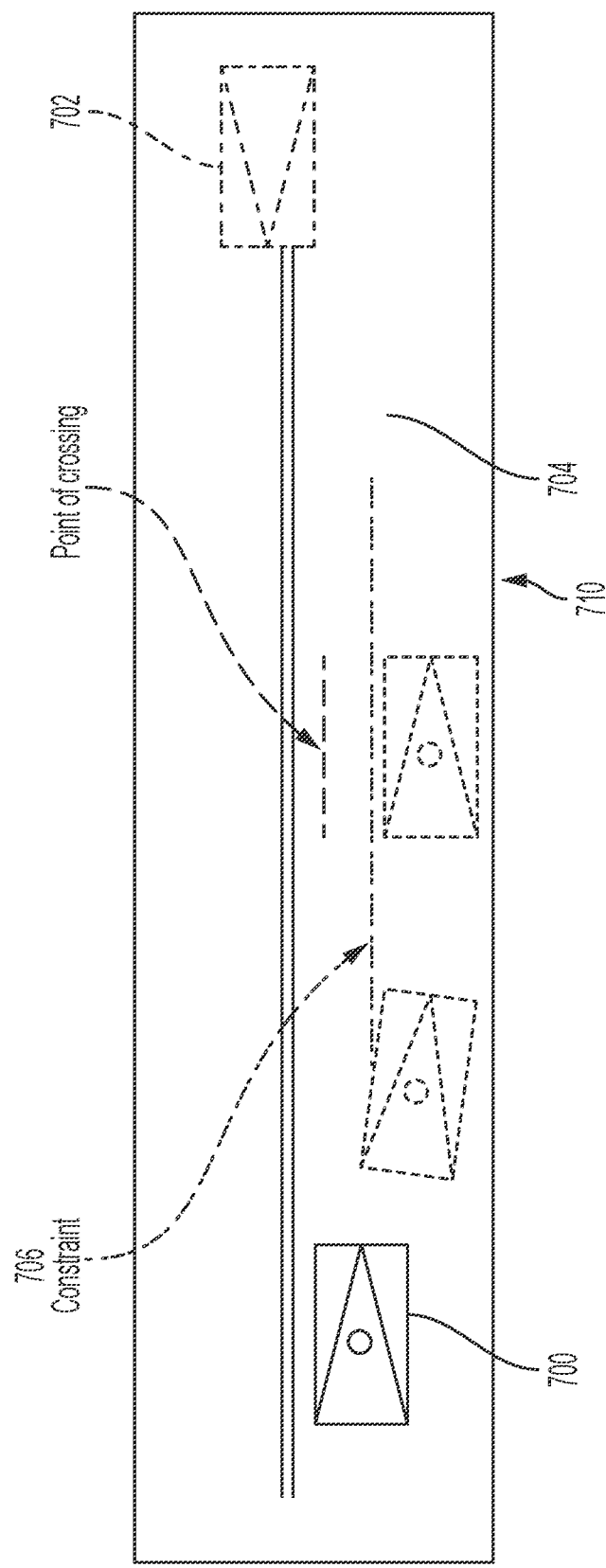
FIG. 7 illustrates an example situation where an object is invading the lane of an autonomous vehicle.

FIG. 7 illustrates an example situation where an object 702 is invading the lane 704 of an autonomous vehicle 700 to a greater degree than illustrated in FIG. 5. As illustrated in FIG. 7, the constraint that is generated 706 has a lateral position that is located further away from the centerline than the position of the constraint 500 in FIG. 5. This difference in lateral position reflects the amount of invasion of object 702.

Figure 14:
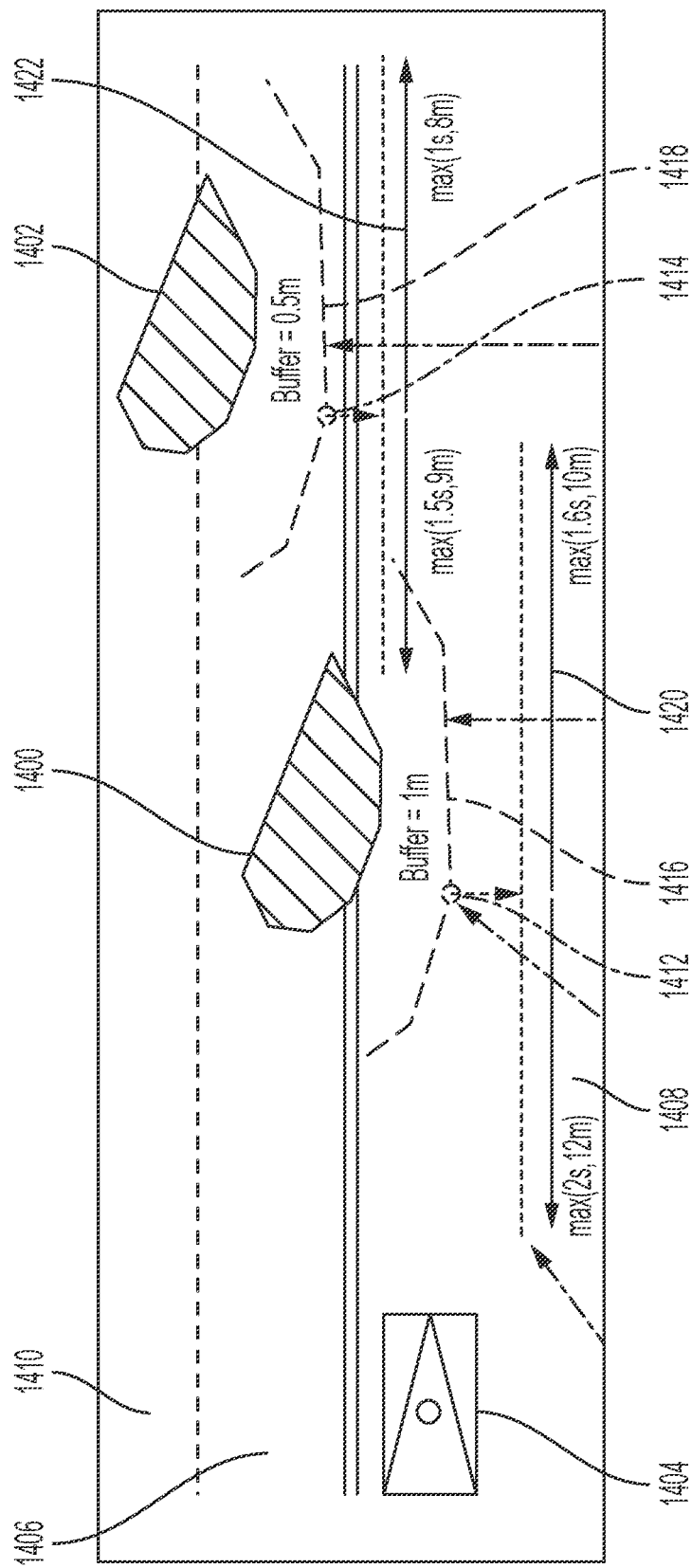
FIG. 14 illustrates an example depiction of objects according to various embodiments.

FIG. 14 illustrates two example objects 1400, 1402 relative to a position of an autonomous vehicle 1404 according to an embodiment. As shown in FIG. 14, one object 1400 is infringing into the lane of the autonomous vehicle 1404, while the other object 1402 is within its own lane and is not infringing into the lane of the autonomous vehicle.

The system may determine invasion data representing an amount of invasion of an object into another lane or other geographical location. For instance, referring to FIG. 14, the invasion data associated with object 1400 may indicate an amount of invasion of the object from its lane 1406 into the lane 1408 of the autonomous vehicle 1404. Similarly, the invasion data associated with object 1402 may indicate an amount of invasion of the object from its lane 1410 into the adjacent lane 1406. Based on the invasion data, the system may determine one or more points of maximum invasion of an object. The point of maximum invasion may represent a location that is the furthest encroachment of an object into an area, such as a lane. A point of maximum invasion 1412 for object 1400 and a point of maximum invasion 1414 for object 1402 are illustrated in FIG. 14.

The system may determine a buffer area for one or more objects based on the location of its corresponding point of maximum invasion. A buffer area may be determined by using a configuration lookup table to determine a buffer area for a point of maximum invasion and/or other invasion data for an object. This buffer area may be applied to a margin of maximum invasion to generate a constraint for an object.

Figure 13:
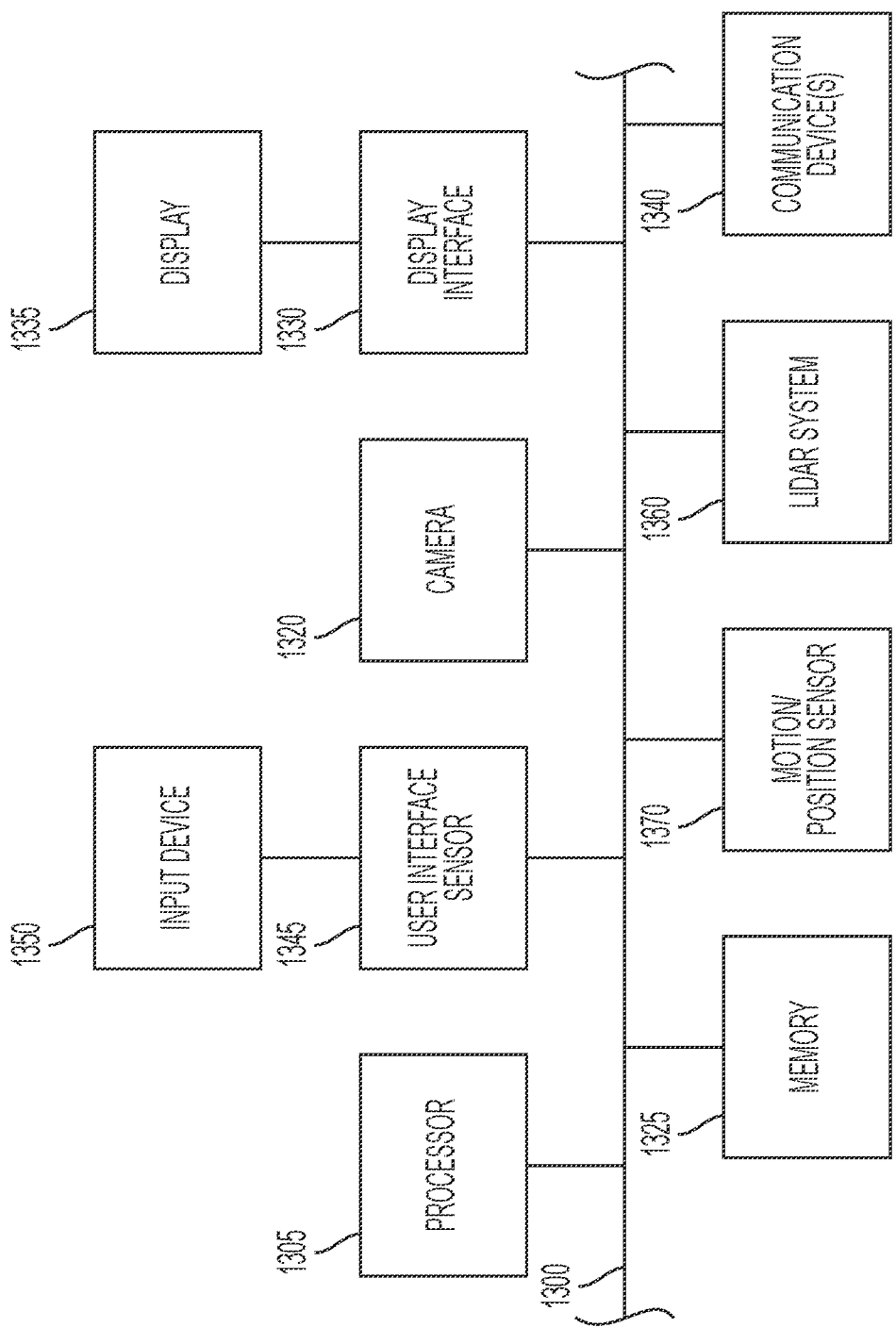
FIG. 13 is a block diagram that illustrates various elements of a possible electronic system, subsystem, controller and/or other component of an autonomous vehicle, and/or external electronic device.

FIG. 13 illustrates an example buffer area 1316 for object 1300 and an example buffer area 1318 for object 1302. FIG. 13 also illustrates an example constraint 1320 for object 1300 and an example constraint 1322 for object 1302. As illustrated in FIG. 13, the area between the buffer 1316 and the constraint 1320 for object 1300 is greater than the area between the buffer 1318 and the constraint 1322 associated with object 1302 since the invasion of object 1300 into lane 1304 is more severe than the invasion into lane 1306.

Referring back to FIG. 1, the system may apply 106 the generated constraint to a motion plan for the autonomous vehicle. In various embodiments, an on-board computing device of an autonomous vehicle may determine a motion plan for the autonomous vehicle based on perception data and/or prediction data. A motion plan refers to data that instructs an autonomous vehicle to perform one or more discrete motions. The motions may satisfy one or more constraints, optimize one or more movement parameters, and/or the like.

The system may apply 106 the constraint to a motion plan by positioning the constraint at the determined starting point (as described above) relative to the object. This position may represent a location of where the autonomous vehicle should begin veering. The constraint may have a length as described above. The constraint may be applied 106 such that it is parallel to one or more road or lane boundaries. The system may position the constraint at a distance from a road boundary that is a function of how much an object is estimated to invade the lane of the autonomous vehicle, as described above.

The system may issue one or more commands to adjust 108 the motion of the autonomous vehicle to comply with a constraint as indicated by the motion plan. In various embodiments, the system may issue one or more commands to adjust the lateral motion (e.g., steering), the longitudinal motion (e.g., speed), and/or a combination of the lateral motion and the longitudinal motion of an autonomous vehicle in order to comply with a constraint. For example, an autonomous vehicle may steer left or right in response to encountering a constraint. As another example, an autonomous vehicle may apply the brake or decelerate in response to encountering a constraint. Additional and/or alternate changes in lateral and/or longitudinal motion may be performed within the scope of this disclosure.

Figure 8A:
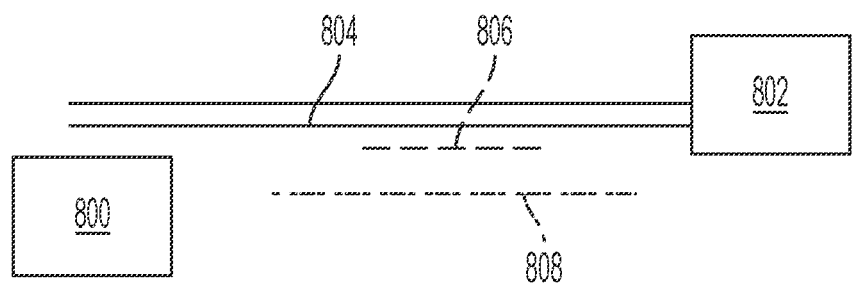
FIGS. 8A-8D illustrate an example trajectory of an autonomous vehicle.

FIGS. 8A-8D illustrate an example trajectory of an autonomous vehicle 800 in response to encountering a constraint 808. As illustrated by FIG. 8A, an object 802 is invading the lane of the autonomous vehicle 800, so constraint 808 has been applied to the map.

Figure 8B:
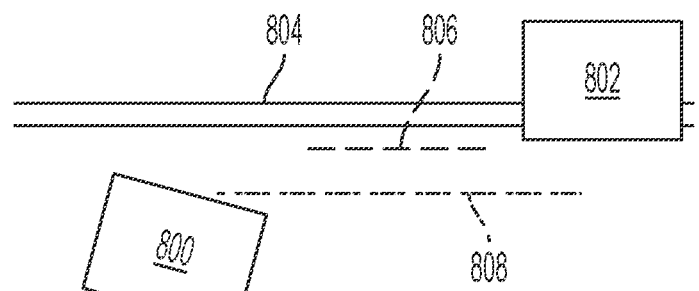
Figure 8C:
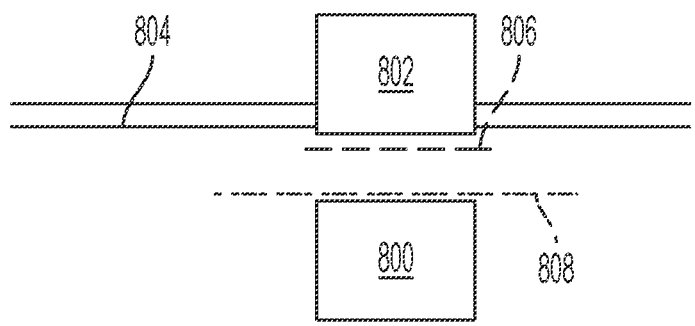

When the autonomous vehicle 800 encounters the constraint 808, the autonomous vehicle adjusts its motion. For example, as illustrated in FIG. 8B, the autonomous vehicle 800 steers toward the right so that the constraint (which is parallel to the center lane boundary marker 804) is between the autonomous vehicle and the object. After making this steering adjusting, the autonomous vehicle 800 may follow a trajectory that is parallel to the constraint 808 along the length of the constraint. This way, as illustrated in FIG. 8C, when the autonomous vehicle 800 and the object 802 navigate past the point of crossing 806, they maintain a separation from one another and do not collide.

Figure 8D:
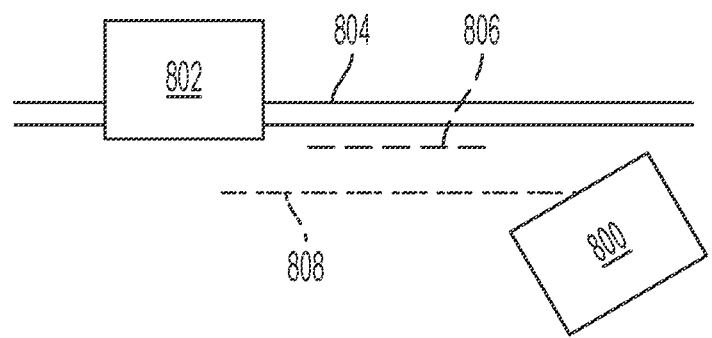

When the autonomous vehicle 800 encounters the end of the constraint 808, the autonomous vehicle may steer toward the left to continue traveling in its lane as illustrated in FIG. 8D.

Although FIGS. 2-8 and their corresponding discussion describes applying a constraint in response to an oncoming object crossing a center line and invading the lane of an autonomous vehicle, it is understood that the system may perform collision avoidance in a manner similar to that described above in response to one or more objects invading the lane of an autonomous vehicle. This may include, for example, an object who is traveling in an adjacent lane to an autonomous vehicle and in the same direction as the autonomous vehicle that crosses the lane boundary.

As another example, the system may apply a constraint for an autonomous vehicle to obey in order to prevent the autonomous vehicle from changing lanes in a way that would not maintain a certain distance between the autonomous vehicle and an object located behind the autonomous vehicle. While making such a lane change may be safe for an autonomous vehicle to perform, it may nonetheless upset the object. As such, this type of constraint may be considered a courtesy constraint.

Figure 9:
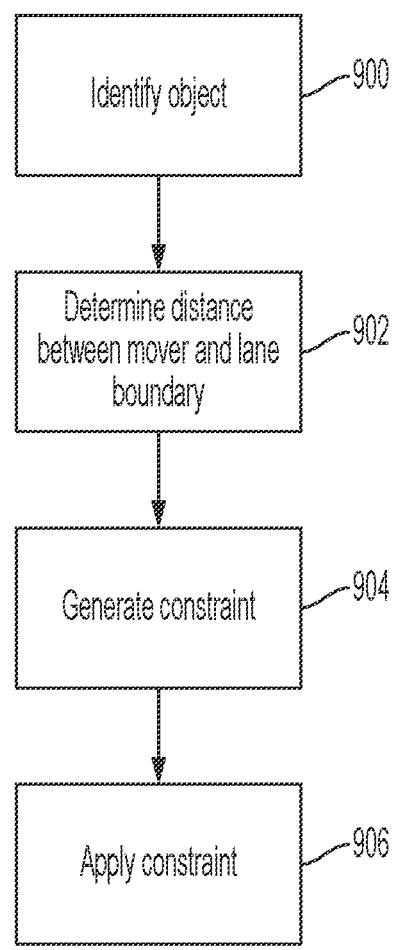
FIG. 9 illustrates an example method of applying a courtesy constraint.

FIG. 9 illustrates an example method of applying a courtesy constraint according to an embodiment. As illustrated by FIG. 9, the system may identify 900 one or more objects located behind the autonomous vehicle. The system may identify 900 an object that is located behind the autonomous vehicle and within a threshold distance of the autonomous vehicle.

Oncoming objects that are traveling in an adjacent lane that are not invading the autonomous vehicle's lane may be considered. The system may apply a constraint for an autonomous vehicle to obey in order to prevent the autonomous vehicle from crossing one or more lane marks. Although it may be safe for an autonomous vehicle to cross a lane mark, it may nonetheless upset the object since the autonomous vehicle will be invading its lane. As such, this type of constraint may be considered a courtesy constraint.

As another example, the system may apply a constraint for an autonomous vehicle to obey to cause the autonomous vehicle to evasively veer for an object that is next to it and traveling in the same direction. Similar to the example of invading a lane of an oncoming object, the amount invasion may be utilized to preemptively cause the autonomous vehicle to veer away from the object so that it does not result in a narrow miss.

Figure 10:
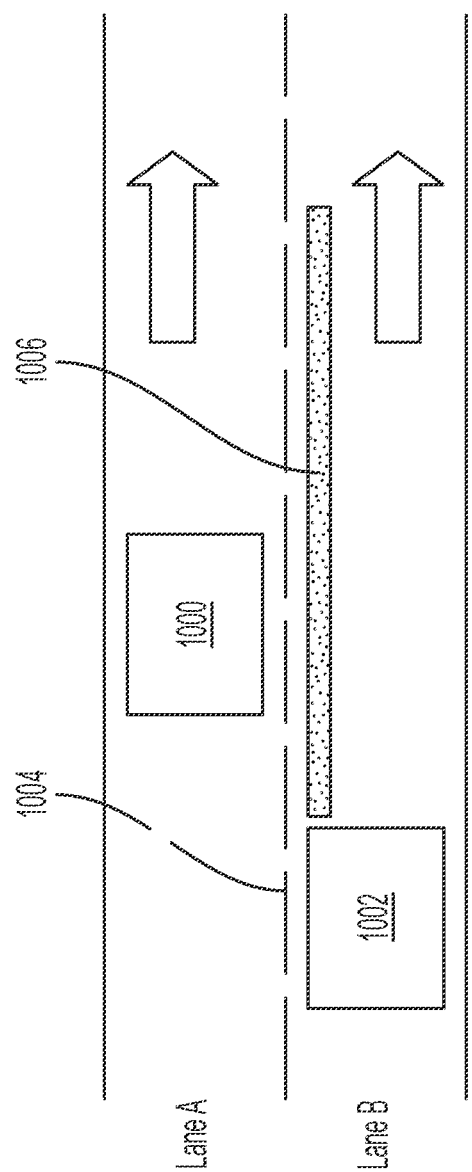
FIG. 10 illustrates an example situation where an object is located behind an autonomous vehicle in an adjacent lane.

FIG. 10 illustrates an example situation where an object 1002 is located behind an autonomous vehicle 1000 in an adjacent lane. In this situation, autonomous vehicle 1000 may identify 900 object 1002.

The system may determine 902 a distance between the object and a lane boundary located between the object and the autonomous vehicle. The lane boundary may be a boundary that separates lanes, such as, for example, a dashed line, according to an embodiment. For instance, referring to FIG. 10, the system may determine 902 a distance between object 1002 and the dashed lane boundary 1004 between the object and the autonomous vehicle 1000.

The system may generate 904 a constraint that has a width equal to the determined distance between the object and the lane boundary. The constraint that is generated may have a length that is based on the amount of invasion of the object.

The system may apply 906 the generated constraint to a motion plan associated with the autonomous vehicle. The constraint may be applied 906 so that it is parallel to one or more road or lane boundaries. For example, the system may apply a constraint so that it is parallel to the lane boundary that is between the autonomous vehicle and the object. For example, referring to FIG. 10, the constraint 1006 is applied parallel to the lane boundary 1004 and has a width equal to the distance between the object 1002 and the lane boundary.

An autonomous vehicle may comply 906 with the constraint when making decisions regarding movement. For example, the autonomous vehicle 1000 of FIG. 10 may not move from Lane A to Lane B so long as the constraint 1006 is applied. The presence of the constraint 1006 may prevent the autonomous vehicle from moving from Lane A to Lane B.

Figure 11:
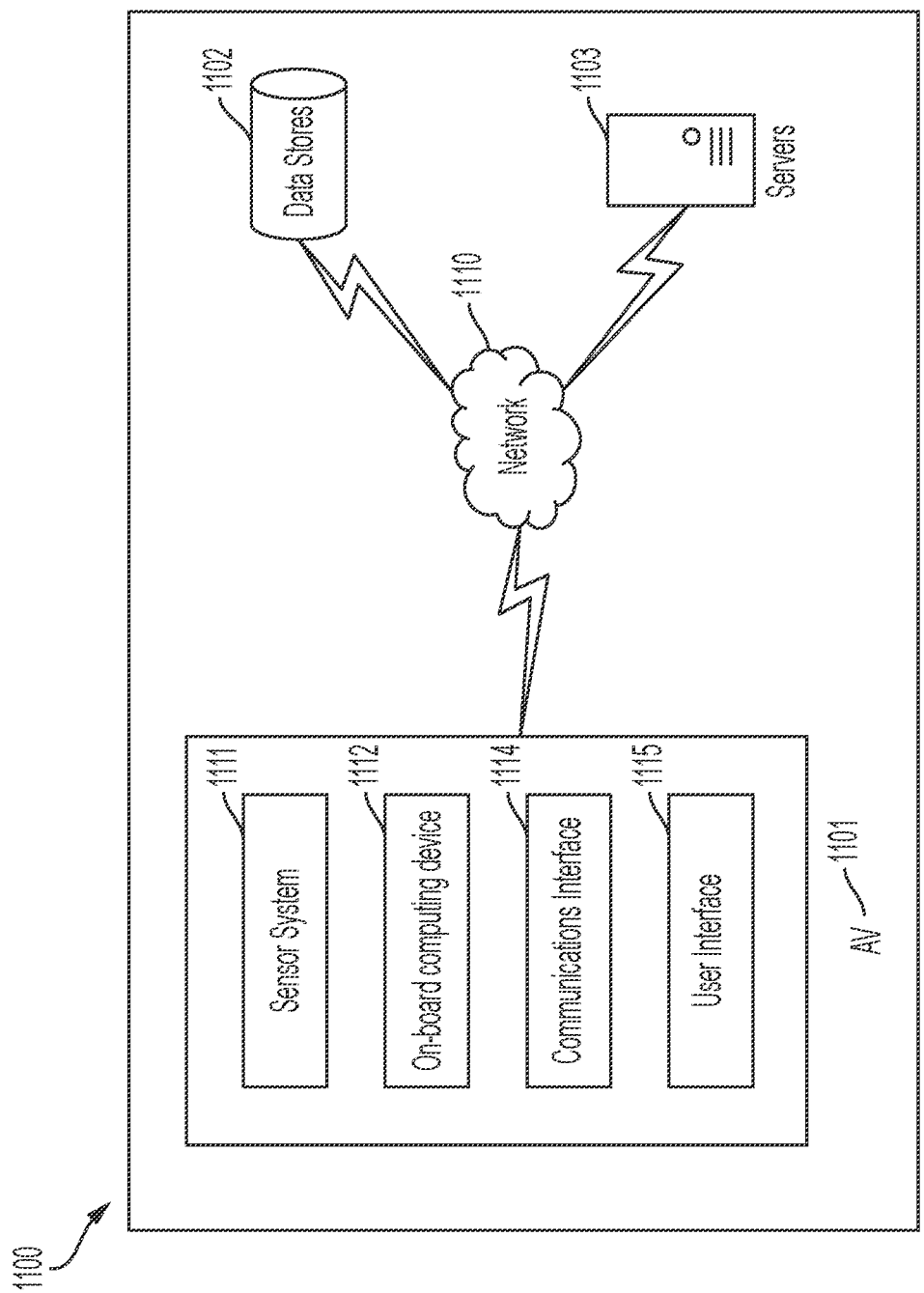
FIG. 11 is a block diagram illustrating an example autonomous vehicle system.

FIG. 11 is a block diagram illustrating an example system 1100 that includes an autonomous vehicle 1101 in communication with one or more data stores 1102 and/or one or more servers 1103 via a network 1110. Although there is one autonomous vehicle shown, multiple autonomous vehicles may be coupled to each other and/or coupled to data stores 1102 and/or servers 1103 over network 1110. Network 1110 may be any type of network such as a local area network (LAN), a wide area network (WAN) such as the Internet, a cellular network, a satellite network, or a combination thereof, and may be wired or wireless. Data store(s) 1102 may be any kind of data store such as, without limitation, map data store(s), traffic information data store(s), user information data store(s), point of interest data store(s), or any other type of content data store(s). Server(s) 1103 may be any kind of servers or a cluster of servers, such as, without limitation, Web or cloud servers, application servers, backend servers, or a combination thereof.

As illustrated in FIG. 11, the autonomous vehicle 1101 may include a sensor system 1111, an on-board computing device 1112, a communications interface 1114, and a user interface 1115. Autonomous vehicle 1101 may further include certain components (as illustrated, for example, in FIG. 12) included in vehicles, such as, an engine, wheel, steering wheel, transmission, etc., which may be controlled by the on-board computing device 1112 using a variety of communication signals and/or commands, such as, for example, acceleration signals or commands, deceleration signals or commands, steering signals or commands, braking signals or commands, etc.

The sensor system 1111 may include one or more sensors that are coupled to and/or are included within the autonomous vehicle 1101. Examples of such sensors include, without limitation, a LiDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 1101, information about the environment itself, information about the motion of the autonomous vehicle 1101, information about a route of the autonomous vehicle, or the like. As autonomous vehicle 1101 travels over a surface, at least some of the sensors may collect data pertaining to the surface.

The LiDAR system may include a sensor configured to sense or detect objects and/or actors in an environment in which the autonomous vehicle 1101 is located. Generally, LiDAR system is a device that incorporates optical remote sensing technology that can measure distance to a target and/or other properties of a target (e.g., a ground surface) by illuminating the target with light. As an example, the LiDAR system may include a laser source and/or laser scanner configured to emit laser pulses and a detector configured to receive reflections of the laser pulses. For example, the LiDAR system may include a laser range finder reflected by a rotating mirror, and the laser is scanned around a scene being digitized, in one, two, or more dimensions, gathering distance measurements at specified angle intervals. The LiDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LiDAR system may be coupled to the first vehicle to scan a complete 360° horizon of the first vehicle. The LiDAR system may be configured to provide to the computing device a cloud of point data representing the surface(s), which have been hit by the laser. The points may be represented by the LiDAR system in terms of azimuth and elevation angles, in addition to range, which can be converted to (X, Y, Z) point data relative to a local coordinate frame attached to the vehicle. Additionally, the LiDAR may be configured to provide intensity values of the light or laser reflected off the surfaces that may be indicative of a surface type. In examples, the LiDAR system may include components such as light (e.g., laser) source, scanner and optics, photo-detector and receiver electronics, and position and navigation system. In an example, The LiDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LiDAR systems for collecting data pertaining to the surface may be included in systems other than the autonomous vehicle 1101 such as, without limitation, other vehicles (autonomous or driven), robots, satellites, etc.

Figure 12:
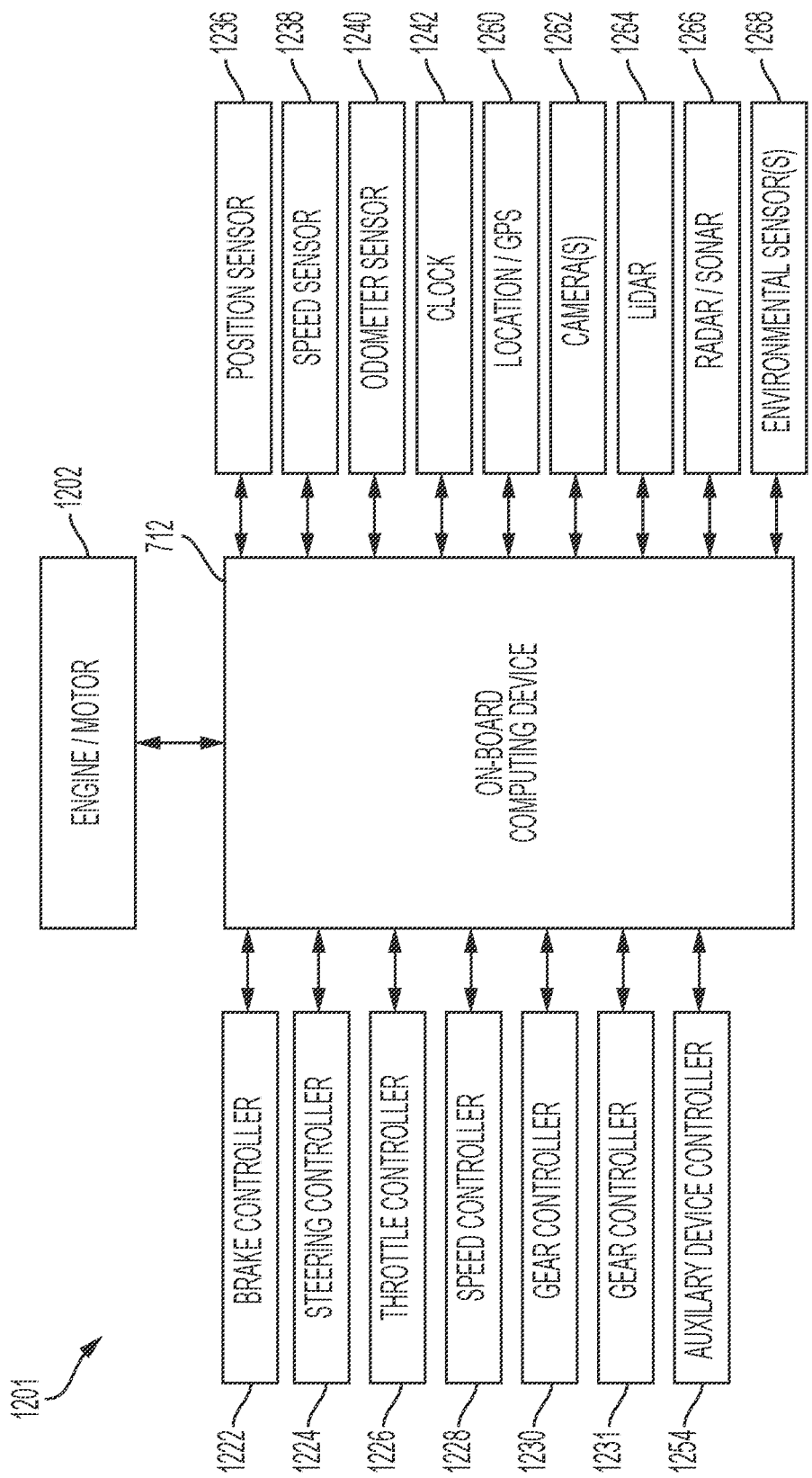
FIG. 12 illustrates an example vehicle controller system.

FIG. 12 illustrates an example system architecture for a vehicle 1201, such as the autonomous vehicle 1101 of FIG. 11. The vehicle 1201 may include an engine or motor 1202 and various sensors for measuring various parameters of the vehicle and/or its environment. Operational parameter sensors that are common to both types of vehicles include, for example: a position sensor 1236 such as an accelerometer, gyroscope and/or inertial measurement unit; a speed sensor 1238; and an odometer sensor 1240. The vehicle 1201 also may have a clock 1242 that the system architecture uses to determine vehicle time during operation. The clock 1242 may be encoded into the vehicle on-board computing device 1212. It may be a separate device, or multiple clocks may be available.

The vehicle 1201 also may include various sensors that operate to gather information about the environment in which the vehicle is traveling. These sensors may include, for example: a location sensor 1260 such as a GPS device; object detection sensors such as one or more cameras 1262; a LiDAR sensor system 1264; and/or a radar and or and/or a sonar system 1266. The sensors also may include environmental sensors 1268 such as a precipitation sensor and/or ambient temperature sensor. The object detection sensors may enable the vehicle 1201 to detect objects that are within a given distance or range of the vehicle 1201 in any direction, while the environmental sensors collect data about environmental conditions within the vehicle's area of travel. The system architecture will also include one or more cameras 1262 for capturing images of the environment.

During operations, information is communicated from the sensors to an on-board computing device 1212. The on-board computing device 1212 analyzes the data captured by the sensors and optionally controls operations of the vehicle based on results of the analysis. For example, the on-board computing device 1212 may control braking via a brake controller 1222; direction via a steering controller 1224; speed and acceleration via a throttle controller 1226 (in a gas-powered vehicle) or a motor speed controller 1228 (such as a current level controller in an electric vehicle); a differential gear controller 1230 (in vehicles with transmissions); and/or other controllers such as an auxiliary device controller 1254.

During a run of the vehicle, information is communicated from the sensors to an on-board computing device 1212. The on-board computing device 1212 analyzes the data captured by the perception system sensors and, acting as a motion planning system, executes instructions to determine a trajectory for the vehicle. The trajectory includes pose and time parameters, and the vehicle's on-board computing device will control operations of various vehicle components to move the vehicle along the trajectory. For example, the on-board computing device 1212 may control braking via a brake controller 1222; direction via a steering controller 1224; speed and acceleration via a throttle controller 1226 (in a gas-powered vehicle) or a motor speed controller 1228 (such as a current level controller in an electric vehicle); a differential gear controller 1230 (in vehicles with transmissions); and/or other controllers.

Geographic location information may be communicated from the location sensor 1260 to the on-board computing device 1212, which may then access a map of the environment that corresponds to the location information to determine known fixed features of the environment such as streets, buildings, stop signs and/or stop/go signals. Captured images from the cameras 1262 and/or object detection information captured from sensors such as a LiDAR system 1264 is communicated from those sensors to the on-board computing device 1212. The object detection information and/or captured images may be processed by the on-board computing device 1212 to detect objects in proximity to the vehicle 1201. In addition or alternatively, the vehicle 1201 may transmit any of the data to a remote server system 1103 (FIG. 11) for processing. Any known or to be known technique for making an object detection based on sensor data and/or captured images can be used in the embodiments disclosed in this document.

The on-board computing device 1212 may obtain, retrieve, and/or create map data that provides detailed information about the surrounding environment of the autonomous vehicle 1201. The on-board computing device 1212 may also determine the location, orientation, pose, etc. of the AV in the environment (localization) based on, for example, three dimensional position data (e.g., data from a GPS), three dimensional orientation data, predicted locations, or the like. For example, the on-board computing device 1212 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 1212 in analyzing the surrounding environment of the autonomous vehicle 1201.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on historical observations of vehicles or other objects over a period of time (e.g., reference paths for straight line travel, lane merge, a turn, or the like).

In certain embodiments, the on-board computing device 1212 may also include and/or may receive information relating to the trip or route of a user, real-time traffic information on the route, or the like.

The on-board computing device 1212 may include and/or may be in communication with a routing controller 1231 that generates a navigation route from a start position to a destination position for an autonomous vehicle. The routing controller 1231 may access a map data store to identify possible routes and road segments that a vehicle can travel on to get from the start position to the destination position. The routing controller 1231 may score the possible routes and identify a preferred route to reach the destination. For example, the routing controller 1231 may generate a navigation route that minimizes Euclidean distance traveled or other cost function during the route, and may further access the traffic information and/or estimates that can affect an amount of time it will take to travel on a particular route. Depending on implementation, the routing controller 1231 may generate one or more routes using various routing methods, such as Dijkstra's algorithm, Bellman-Ford algorithm, or other algorithms. The routing controller 1231 may also use the traffic information to generate a navigation route that reflects expected conditions of the route (e.g., current day of the week or current time of day, etc.), such that a route generated for travel during rush-hour may differ from a route generated for travel late at night. The routing controller 1231 may also generate more than one navigation route to a destination and send more than one of these navigation routes to a user for selection by the user from among various possible routes.

In various embodiments, an on-board computing device 1212 may determine perception information of the surrounding environment of the autonomous vehicle 1201. Based on the sensor data provided by one or more sensors and location information that is obtained, the on-board computing device 1212 may determine perception information of the surrounding environment of the autonomous vehicle 1201. The perception information may represent what an ordinary driver would perceive in the surrounding environment of a vehicle. The perception data may include information relating to one or more objects in the environment of the autonomous vehicle 1201. For example, the on-board computing device 1212 may process sensor data (e.g., LiDAR or RADAR data, camera images, etc.) in order to identify objects and/or features in the environment of autonomous vehicle 1201. The objects may include traffic signals, road way boundaries, other vehicles, pedestrians, and/or obstacles, etc. The on-board computing device 1212 may use any now or hereafter known object recognition algorithms, video tracking algorithms, and computer vision algorithms (e.g., track objects frame-to-frame iteratively over a number of time periods) to determine the perception.

In some embodiments, the on-board computing device 1212 may also determine, for one or more identified objects in the environment, the current state of the object. The state information may include, without limitation, for each object: current location; current speed and/or acceleration, current heading; current pose; current shape, size, or foot; type (e.g., vehicle vs. pedestrian vs. bicycle vs. static object or obstacle); and/or other state information.

The on-board computing device 1212 may perform one or more prediction and/or forecasting operations. For example, the on-board computing device 1212 may predict future locations, trajectories, and/or actions of one or more objects. For example, the on-board computing device 1212 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 1201, the surrounding environment, and/or their relationship(s). For example, if an object is a vehicle and the current driving environment includes an intersection, the on-board computing device 1212 may predict whether the object will likely move straight forward or make a turn. If the perception data indicates that the intersection has no traffic light, the on-board computing device 1212 may also predict whether the vehicle may have to fully stop prior to enter the intersection.

In various embodiments, the on-board computing device 1212 may determine a motion plan for the autonomous vehicle. For example, the on-board computing device 1212 may determine a motion plan for the autonomous vehicle based on the perception data and/or the prediction data. Specifically, given predictions about the future locations of proximate objects and other perception data, the on-board computing device 1212 can determine a motion plan for the autonomous vehicle 1201 that best navigates the autonomous vehicle relative to the objects at their future locations.

In one or more embodiments, the on-board computing device 1212 may receive predictions and make a decision regarding how to handle objects and/or actors in the environment of the autonomous vehicle 1201. For example, for a particular actor (e.g., a vehicle with a given speed, direction, turning angle, etc.), the on-board computing device 1212 decides whether to overtake, yield, stop, and/or pass based on, for example, traffic conditions, map data, state of the autonomous vehicle, etc. Furthermore, the on-board computing device 1212 also plans a path for the autonomous vehicle 1201 to travel on a given route, as well as driving parameters (e.g., distance, speed, and/or turning angle). That is, for a given object, the on-board computing device 1212 decides what to do with the object and determines how to do it. For example, for a given object, the on-board computing device 1212 may decide to pass the object and may determine whether to pass on the left side or right side of the object (including motion parameters such as speed). The on-board computing device 1212 may also assess the risk of a collision between a detected object and the autonomous vehicle 1201. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 1212 may execute one or more control instructions to perform a cautious maneuver (e.g., mildly slow down, accelerate, change lane, or swerve). In contrast, if the collision cannot be avoided, then the on-board computing device 1212 may execute one or more control instructions for execution of an emergency maneuver (e.g., brake and/or change direction of travel).

As discussed above, planning and control data regarding the movement of the autonomous vehicle is generated for execution. The on-board computing device 1212 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and/or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 11, the communications interface 1114 may be configured to allow communication between autonomous vehicle 1101 and external systems, such as, for example, external devices, sensors, other vehicles, servers, data stores, databases etc. Communications interface 1114 may utilize any now or hereafter known protocols, protection schemes, encodings, formats, packaging, etc. such as, without limitation, Wi-Fi, an infrared link, Bluetooth, vehicle-to-vehicle, vehicle-to-object, or V2X communication protocols, etc. (The term "V2X" refers to a communication between a vehicle and any object that the vehicle may encounter or affect in its environment.) User interface system 1115 may be part of peripheral devices implemented within a vehicle 1101 including, for example, a keyboard, a touch screen display device, a microphone, and a speaker, etc.

FIG. 13 depicts an example of internal hardware that may be included in any of the electronic components of the system, such as internal processing systems of the AV, external monitoring and reporting systems, or remote servers. An electrical bus 1300 serves as an information highway interconnecting the other illustrated components of the hardware. Processor 1305 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 1325. A memory device may include a single device or a collection of devices across which data and/or instructions are stored. Various embodiments may include a computer-readable medium containing programming instructions that are configured to cause one or more processors to perform the functions described in the context of the previous figures.

An optional display interface 1330 may permit information from the bus 1300 to be displayed on a display device 1335 in visual, graphic or alphanumeric format, such on an in-dashboard display system of the vehicle. An audio interface and audio output (such as a speaker) also may be provided. Communication with external devices may occur using various communication devices 1340 such as a wireless antenna, a radio frequency identification (RFID) tag and/or short-range or near-field communication transceiver, each of which may optionally communicatively connect with other components of the device via one or more communication system. The communication device(s) 1340 may be configured to be communicatively connected to a communications network, such as the Internet, a local area network or a cellular telephone data network.

The hardware may also include a user interface sensor 1345 that allows for receipt of data from input devices 1350 such as a keyboard or keypad, a joystick, a touchscreen, a touch pad, a remote control, a pointing device and/or microphone. Digital image frames also may be received from a camera 1320 that can capture video and/or still images. The system also may receive data from a motion and/or position sensor 1370 such as an accelerometer, gyroscope or inertial measurement unit. The system also may receive data from a LiDAR system 1360 such as that described earlier in this document.

Any or all of these sensors will capture sensor data that will enable one or more processors of the vehicle's on-board computing device and/or external devices to execute programming instructions that enable the computing system to classify objects in the perception data, and all such sensors, processors and instructions may be considered to be the vehicle's perception system. The vehicle also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The term "object", when referring to an object that is detected by a vehicle perception system or simulated by a simulation system, is intended to encompass both stationary objects and moving (or potentially moving) actors, except where specifically stated otherwise by terms use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method, comprising:
   by one or more electronic devices:
   identifying an object that is invading a lane that an autonomous vehicle is occupying,
   generating a constraint about a point of crossing, wherein the constraint comprises a direction and a length, and wherein the point of crossing represents a location of where the object and the autonomous vehicle will collide if the object maintains its current trajectory and the autonomous vehicle maintains its current trajectory,
   applying the constraint to a motion plan associated with the autonomous vehicle, and
   issuing one or more commands to adjust movement of the autonomous vehicle in response to encountering the constraint,
   wherein generating the constraint about the point of crossing comprises generating the constraint by selecting a higher of a minimum distance or a product value as a constraint length, wherein the minimum distance represents a distance before the point of crossing, and wherein the product value represents a product of a minimum amount of time before the point of crossing and a current speed of the autonomous vehicle.

2. The method of claim 1, wherein identifying an object that is invading a lane that the autonomous vehicle is occupying comprises identifying an oncoming object that is crossing a centerline of a road.

3. The method of claim 1, wherein generating the constraint about the point of crossing comprises generating the constraint with the direction of the constraint being parallel to a lane boundary that is located between the autonomous vehicle and the object.

4. The method of claim 1, wherein a starting point for the constraint is based on:
- a distance value between the autonomous vehicle and the point of crossing, and
- a difference between the distance value and the constraint length.

5. The method of claim 1, wherein generating the constraint about the point of crossing comprises generating the constraint with a lateral position relative to a lane boundary that is a function of an amount of invasion of the object into the lane.

6. The method of claim 1, wherein issuing the command to adjust the movement of the autonomous vehicle in response to encountering the constraint comprises issuing the command to adjust lateral motion of the autonomous vehicle.

7. The method of claim 1, wherein issuing the one or more commands to adjust the movement of the autonomous vehicle in response to encountering the constraint comprises issuing the one or more commands to adjust the longitudinal motion of the autonomous vehicle.

8. A system, comprising: an electronic device; and
a computer-readable storage medium comprising one or more programming instructions that, when executed, cause the electronic device to:
  identify an object that is invading a lane that an autonomous vehicle is occupying, generate a constraint about a point of crossing, wherein the constraint comprises a
  direction and a length, and wherein the point of crossing represents a location of where the object and the autonomous vehicle will collide if the object maintains its current trajectory and the autonomous vehicle maintains its current trajectory,
  apply the constraint to a motion plan associated with the autonomous vehicle, and issue one or more commands to adjust movement of the autonomous vehicle in response to encountering the constraint,
wherein to generate the constraint about the point of crossing, the one or more programming instructions further cause the electronic device to select a higher of a minimum distance or a product value as a constraint length, wherein the minimum distance represents a distance before the point of crossing, and wherein the product value represents a product of a minimum amount of time before the point of crossing and a current speed of the autonomous vehicle.

9. The system of claim 8, wherein to identify an object that is invading a lane that the autonomous vehicle is occupying, the one or more programming instructions further cause the electronic device to identify an oncoming object that is crossing a centerline of a road.

10. The system of claim 8, wherein to generate the constraint about the point of crossing comprises one or more programming instructions further cause the electronic device to generate the constraint with the direction of the constraint being parallel to a lane boundary that is located between the autonomous vehicle and the object.

11. The system of claim 8, wherein a starting point for the constraint is based on:
- a distance value between the autonomous vehicle and the point of crossing, and
- a difference between the distance value and the constraint length.

12. The system of claim 8, wherein to generate the constraint about the point of crossing, the one or more programming instructions further cause the electronic device to generate the constraint with a lateral position relative to a lane boundary that is a function of an amount of invasion of the object into the lane.

13. The system of claim 8, wherein to issue one or more commands to adjust movement of the autonomous vehicle in response to encountering the constraint, the one or more programming instructions further cause the electronic device to issue one or more commands to adjust lateral motion of the autonomous vehicle.

14. The system of claim 8, wherein to issue one or more commands to adjust movement of the autonomous vehicle in response to encountering the constraint, the one or more programming instructions further cause the electronic device to issue one or more commands to adjust longitudinal motion of the autonomous vehicle.

15. A computer program product comprising a memory and programming instructions that are configured to cause a processor to:
  identify an object that is invading a lane that the autonomous vehicle is occupying;
  generate a constraint about a point of crossing, wherein the constraint comprises a direction and a length, and wherein the point of crossing represents a location of where the object and the autonomous vehicle will collide if the object maintains its current trajectory and the autonomous vehicle maintains its current trajectory;
  apply the constraint to a motion plan associated with the autonomous vehicle, and
  issue one or more commands to adjust movement of the autonomous vehicle in response to encountering the constraint.

16. The computer program product of claim 15, wherein, to issue the one or more commands to adjust movement of the autonomous vehicle in response to encountering the constraint, the programming instructions further cause the electronic device to issue the one or more commands to adjust lateral motion of the autonomous vehicle.

17. The computer program product of claim 15, wherein, to issue the one or more commands to adjust movement of the autonomous vehicle in response to encountering the constraint, the programming instructions further cause the electronic device to issue the one or more commands to adjust longitudinal motion of the autonomous vehicle.

18. The computer program product of claim 15, wherein, to generate the constraint about the point of crossing, the programming instructions further cause the electronic device to select a higher of a minimum distance or a product value as a constraint length, wherein the minimum distance represents a distance before the point of crossing, and wherein the product value represents a product of a minimum amount of time before the point of crossing and a current speed of the autonomous vehicle.

19. The computer program product of claim 15, wherein the current trajectory of the object is opposite to the current trajectory of the autonomous vehicle in a longitudinal direction, and the constraint is indicative of a lateral motion of the autonomous vehicle.

* * * * *